United States Patent [19]
Karlsson et al.
[11] Patent Number: 4,467,950
[45] Date of Patent: Aug. 28, 1984

[54] ARRANGEMENT FOR PULLING THE TAIL OF A WEB-LIKE MATERIAL THROUGH A DRYING OR COOLING PLANT

[75] Inventors: Ingemar Karlsson; Percyval Svensson; Eric Nelenius; Göran Svensson; Axel Ydrefors, all of Växjö , Sweden; Bengt Lindström, Takapuna, New Zealand

[73] Assignee: Flakt AB, Nacka, Sweden

[21] Appl. No.: 411,271

[22] Filed: Aug. 25, 1982

[30] Foreign Application Priority Data

Aug. 27, 1981 [SE] Sweden ............................... 8105078

[51] Int. Cl.[3] ......................... G03B 1/36; F26B 11/02

[52] U.S. Cl. ....................................... 226/91; 34/117; 34/120

[58] Field of Search ............... 226/90, 91, 12; 34/120, 34/117, 151–152; 24/265

[56] References Cited

U.S. PATENT DOCUMENTS

| | | | |
|---|---|---|---|
| 3,199,219 | 8/1965 | Brauer et al. | 34/120 |
| 3,265,267 | 8/1966 | Wallin | 226/91 |
| 3,277,550 | 10/1966 | Rosengvist | 24/265 |
| 3,508,342 | 4/1970 | Leutchouk et al. | 34/120 |
| 3,643,343 | 2/1972 | Marchal | 34/120 |

*Primary Examiner*—Leonard D. Christian
*Attorney, Agent, or Firm*—Oblon, Fisher, Spivak, McClelland & Maier

[57] ABSTRACT

The invention relates to an arrangement for pulling the tail of a web-like material through a drying or cooling plant. In such a plant the web-like material is floated on air at a given distance from a surface provided with air delivery orifices. The web-like material (10) is thereby caused to pass zig-zag over drivable reversing rolls (2), while an endless traction or pulling member (3) in the form of a belt or rope runs in a separate path through the plant, substantially parallel to the material web, and is provided with means (12,13,14,15) with the aid of which the forward web end or tail (11) is attachable for pulling through the plant. At least one of the reversing rolls (2) is adapted at one end portion for carrying the tail pulling member either directly or over a pulley (9) drivably connected to said end portion. Driving the tail traction member is performed with the same means as drive the reversing rolls. The means (13) for fixing the tail (11) to the traction member (8) has a given stretching ability for preventing the material web (10) from rupturing.

10 Claims, 8 Drawing Figures

ARRANGEMENT FOR PULLING THE TAIL OF A WEB-LIKE MATERIAL THROUGH A DRYING OR COOLING PLANT

FIELD OF THE INVENTION

The present invention relates to an arrangement for advancing the forward end of a web-like material through a drying or cooling plant (so-called tail pulling) in which the web-like material is supported on air at a given distance from a surface provided with air discharge orifices, where the material is caused to pass over drivable reversing rolls so that it runs zig-zag through the plant, there also being an endless traction member in the form of a belt or rope running in a separate path through the dryer or cooler, substantially parallel to the web-like material path and provided with means to which the forward end of the web-like material can be attached for pulling it through the plant.

BACKGROUND OF THE INVENTION

Tail pulling means are already known in a plurality of different embodiments, as will be apparent inter alia from the U.S. Pat. Nos. 3,643,343, 3,277,550, 3,265,267 and 3,199,219. It is clear from these publications, especially the first-mentioned one, that in pulling the tail of a web-like material through a drying plant two different driving systems have to be utilized, one for the web-like material and one for the endless traction member in the form of a rope or belt. The reason for this is that the web-like material is subjected to longitudinal shrinkage during its advance through the dryer, due to drying, a velocity difference thus occurring between the web-like material and the traction member. When the tail is advanced through a dryer having considerable length, this velocity difference can cause a break in the web-like material, and for this reason special drive rolls and drive means for the tail puller must be installed in such dryers, and arrangements must be made to ensure that the velocities of the traction member and the web-like material do not deviate too much from each other, but keep within certain given limiting values which are dependent on the special conditions prevailing for the plant in question. These conditions are such as the length of the web-like material inside the dryer, the drying temperature, the moisture content of the material, its composition and its velocity in the dryer, which in other words is the time a certain section of the material is in the dryer. As a result of all the different conditions, there will be a difference between the peripheral velocity of the reversing rolls and the velocity of the web-like material through the dryer, since the conditions result in longitudinal dimensional alteration of the material, and this means that the traction member velocity must be adjusted to the actual velocity of the material in order that the velocity relationship between web and member will be kept within permitted values.

It will be clear from what has been said above that in the prior art a driving system for tail pulling is extremely complicated and thereby expensive, since complicated control equipment is required for driving the puller. Furthermore, special driving means are required for the puller, signifying in practice that it is impossible to install tail pulling equipment in an older type of existing dryer where there is no such modern facility.

OBJECTS OF THE INVENTION

The object of the present invention is to enable the installation of a traction arrangement for the tail with an endless traction member in the form of a rope or belt, this arrangement being substantially more simple than the pullers in the prior art, and also installable in existing, older drying or cooling plants without their having to be modified or altered to any notable degree.

SUMMARY OF THE INVENTION

This object is achieved in accordance with the invention mainly in that at least one of the reversing rolls is adapted at its end portion to carry the tail pulling or traction member either directly or over a pulley drivably connected to said end portion, driving the tail conveyor taking place at least partially with the same means as effect driving the reversing rolls, and in that the tail is affixed to the traction member with fixings having a given stretching ability, in order to prevent a break in the material web. Since the reversing rolls may simultaneously serve as guide and drive rolls for the tail puller, the need of separate drive rollers for the traction member has been eliminated. The difference between the velocities of web and traction member which may occur are taken up by the elastic fixing connecting the tail to the conveying member. An arrangement for fixing the tail to the conveying member will be seen from the above-mentioned U.S. Pat. No. 3,277,550, for example.

BRIEF DESCRIPTION OF THE DRAWINGS

Some embodiments of the arrangement in accordance with the invention, selected as examples, will be apparent from the appended drawings, on which

DETAILED DESCRIPTION OF THE PRESENTLY PREFERRED EMBODIMENTS

Figure 1:
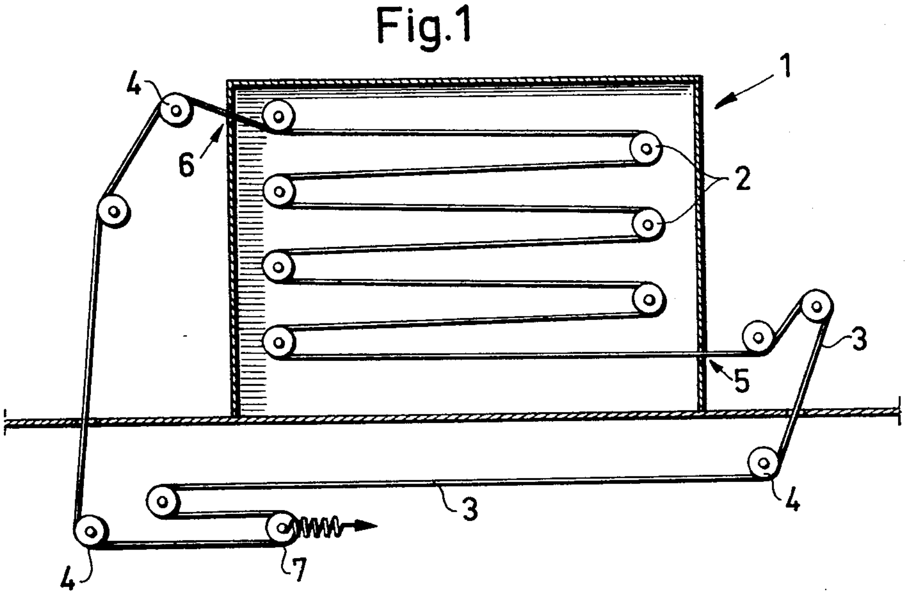
FIG. 1 schematically illustrates a drying plant with an arrangement including an endless traction member in the form of a belt or rope.

FIG. 1 schematically illustrates a drying plant 1 in which web-like material is caused to pass over a plurality of drivable reversing rolls 2 so that the web runs zig-zag through the dryer. The plant further includes an arrangement for tail pulling with an endless traction member 3 in the form of a belt or rope, running in a separate path through the plant, substantially parallel to the material web and provided with means (see FIG. 2) with which the tail is joined to the endless traction member 3. The member 3 is entirely or partially driven with the aid of the reversing rolls 2, or in combination with one or more of the rollers 4 which lead the member 3 from the outlet 5 of the drying plant to its input 6. Suitable tension of the member is provided with the aid of a spring-loaded pulley 7 in the illustrated embodiment, the spring bias enabling determination of the stretch in the conveying member. Suitable bias of the member is provided in the illustrated embodiment with the aid of a take-up apparatus, for example where loading weights on a pulley decide the spring bias.

Figure 2:
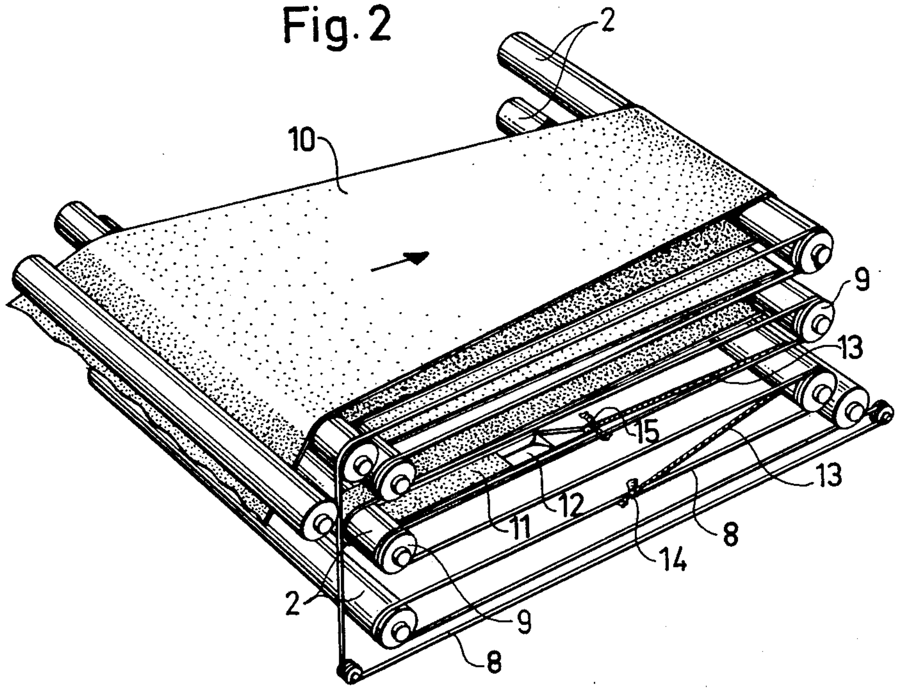
FIG. 2 is a perspective view of a detail of the plant in FIG. 1, using a rope for tail pulling.

In the embodiment illustrated in FIG. 2 the arrangement includes an endless rope 8 running over grooved wheels 9 (see FIG. 4) rigidly connected to the ends of the reversing rolls 2. In the Figure it is shown how the forward end of a paper pulp web 10 is conveyed through the plant and over the reversing rolls 2 with the aid of the rope 8 such that the paper pulp tail 11 is retained by a holder 12 which in turn is attached to the rope 8 by means of a cord or belt 13. Connection to the traction member 8 can be made in the simplest way, namely by tying the cord 13 to the rope 8. In accordance with the invention, the cord 13 has a given stretching ability to prevent the occurrance of too large tensional stresses in the material web 10, which would otherwise cause its tail 11 to rupture. The reason for these tensional stresses was explained in the introduction, and they are connected with the fact that the pulp dries during tail pulling, since the drying plant is heated, thus causing the web 10 to receive certain longitudinal dimensional alterations resulting in that the web velocity will not conform to the velocity of the traction member 8, and the relative positions of the attachment point 14 of the cord 13 at said member 8 and its attachment point 15 at the holder 12 are mutually displaced so that there will be abnormal stresses in the cord 13 as well as the web 10 and tail 11. If these stresses become too great, a rupture can occur in the material web.

Figure 3:
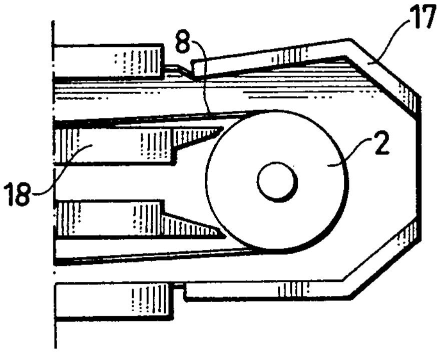
FIG. 3 is a cross-section through the area around a reversing roll in a drying plant according to FIG. 1.
Figure 4:
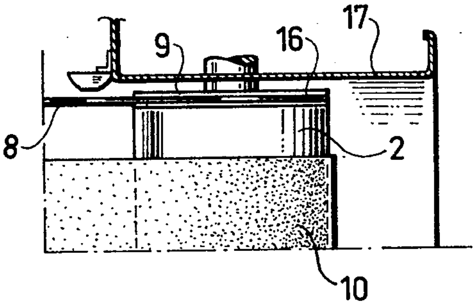
FIG. 4 is a longitudinal section through an end portion of the reversing roll according to FIG. 3.

In FIGS. 3 and 4 it is shown how the traction or pulling member, in this case the rope 8, is taken over a wheel 9 provided with a groove 16, said wheel being formed as a sheave connected to the reversing roll 2 either by bolts or by some other force-transmitting connection which can be released if required. All the sheaves do not need to be drivably connected to the associated end portions of the reversing rolls, and some of them can rotate freely about a shaft coaxial with the respective reversing roll. It will also be seen from FIG. 3 how the reversing roll 2 is enclosed in a casing 17, and from the Figure may also be seen the arrangements of the surfaces provided with air delivery orifices (not shown) formed by blow boxes 18. The material web is thus kept floating at a given distance from the surfaces by means of the air stream blown out of the orifices.

Figure 5:
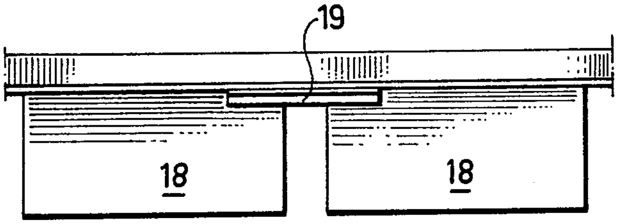
FIG. 5 is a side view of a central portion of the plant according to FIG. 1, with a rope traction member.
Figure 6:
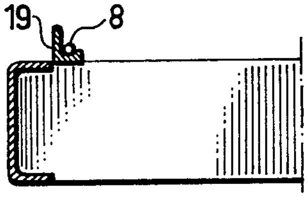
FIG. 6 is a cross-section through the central portion according to FIG. 5.

It will be seen from the details of a middle section of the drying plant illustrated in FIGS. 5 and 6 how the blow boxes 18 are arranged and mutually connected by a guide rail 19 which is also part of the traction arrangement and has an L-shaped cross-section with a depression in the foot of the section for maintaining the traction rope in place, and preventing lateral displacement thereof.

Figure 7:
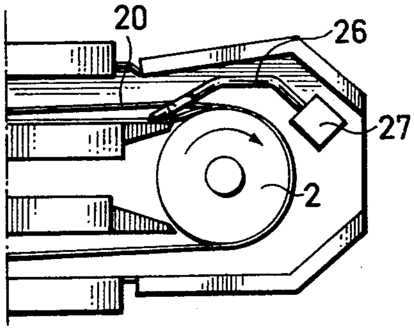
FIG. 7 is a cross-section through the area around a reversing roll in accordance with an alternative embodiment of the conveyor.
Figure 8:
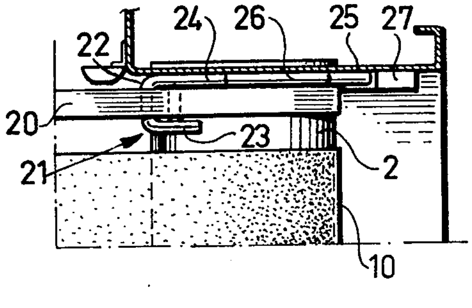
FIG. 8 is a longitudinal section through the portion according to FIG. 7.

An alternative embodiment of the arrangement is illustrated in FIGS. 7 and 8, where the traction member is a belt 20, lying directly against an end portion of the reversing roll 2 and maintained in its path with the aid of a substantially U-shaped guide member 21, so arranged that the belt 20 runs over the web portion 22 of said member, while its limbs 23 and 24 prevent lateral displacement of the belt 20 on the reversing roll 2. The guide member 21 has an extension or arm 26 fixed in a holder 27 which is in turn fixed to an end wall 25 for the reversing roll 2. This type of traction belt is usually utilized in old dryers where there is often insufficient space for attaching a sheave between the end wall 25 and the end of the reversing roll, which is however possible in later types of dryer, as will be seen from FIG. 4. The difference in construction between the dryers in FIG. 4 and FIG. 8 is thus that the reversing roll 2 projects outside the end wall 25 in the latter case, whereas the end wall 17 in FIG. 4 is situated at a distance from the end of the reversing roll 2.

We claim:

1. Apparatus for advancing the forward end of a web through a plant in which the web is subject to longitudinal shrinkage, said plant comprising:

(a) a housing;

(b) a plurality of drivable rolls mounted in said housing in position so that the web runs zig-zag through said housing; and (c) means for supporting the web on a curtain of air as it passes around said drivable rolls;

said apparatus for advancing the forward end of the web comprising:

(d) an endless member running in a separate path through said housing, the separate path being substantially parallel to the path followed by the web and said endless member being driven such that the speed of said endless member is at least substantially the same as the surface speed of said drivable rolls, and (e) means for attaching the forward end of the web to said endless member so as to transmit the pulling force of said endless member to the web, said means comprising an elastic cord member the stretching ability of which prevents the web from rupturing due to the longitudinal shrinkage of the web as it passes through the plant.

2. Apparatus as recited in claim 1 wherein said plant is a drying or cooling plant.

3. Apparatus as recited in claim 1 wherein said drivable rolls are reversing rolls.

4. Apparatus as recited in claim 1 wherein said drivable rolls are adapted to carry said endless member at their end portions.

5. Apparatus as recited in claim 1 wherein said means for supporting the web on a curtain of air comprise a plurality of blow boxes positioned adjacent said drivable rolls.

6. Apparatus as recited in claim 1 wherein said endless member is trained over a plurality of pulleys drivably connected to said drivable rolls.

7. Apparatus as recited in claim 6 wherein said pulleys comprise sheaves which are rigidly connected to said drivable rolls.

8. Apparatus as recited in claim 1 wherein said endless member is trained over a plurality of guide means mounted on the ends of said drivable rolls, said guide means being substantially U-shaped and being disposed so that said endless member runs over the bottom of said U-shaped guide means and the legs of said U-shaped guide means serve to prevent lateral displacement of said endless member on said drivable rolls.

9. Apparatus as recited in claim 1 wherein said endless member is a belt.

10. Apparatus as recited in claim 1 wherein said endless member is a rope.

* * * * *